(12) United States Patent
Sasankan et al.

(10) Patent No.: US 10,242,383 B2
(45) Date of Patent: Mar. 26, 2019

(54) METHOD AND SYSTEM FOR DELIVERING ADVERTISEMENTS IN A STORE

(75) Inventors: Sanal Sasankan, Richmond (CA); Pengfei Zhang, Surrey (CA)

(73) Assignee: Sanal Sasankan, Richmond, British Columbia (CA)

( * ) Notice: Subject to any disclaimer, the term of this patent is extended or adjusted under 35 U.S.C. 154(b) by 622 days.

(21) Appl. No.: 13/216,258

(22) Filed: Aug. 24, 2011

(65) Prior Publication Data

US 2013/0054363 A1   Feb. 28, 2013

(51) Int. Cl.
G06Q 30/00 (2012.01)
G06Q 30/02 (2012.01)

(52) U.S. Cl.
CPC ................ *G06Q 30/0259* (2013.01)

(58) Field of Classification Search
CPC .................................................. G06Q 30/0259
USPC ................................................ 705/14, 14.64
See application file for complete search history.

(56) References Cited

U.S. PATENT DOCUMENTS

| 7,860,519 | B2 | 12/2010 | Portman et al. | |
|---|---|---|---|---|
| 2007/0198339 | A1 | 8/2007 | Shen | |
| 2009/0012704 | A1* | 1/2009 | Franco | G01C 21/20 701/532 |
| 2009/0187466 | A1* | 7/2009 | Carter | G06Q 30/02 705/7.34 |
| 2011/0191237 | A1* | 8/2011 | Faith et al. | 705/39 |
| 2012/0303455 | A1* | 11/2012 | Busch | 705/14.57 |
| 2012/0310746 | A1* | 12/2012 | Zhao et al. | 705/14.66 |

* cited by examiner

*Primary Examiner* — Matthew T Sittner
*Assistant Examiner* — Azam A Ansari
(74) *Attorney, Agent, or Firm* — McCarthy Tetrault LLP

(57) ABSTRACT

A method of delivering promotional content to a navigation application in a mobile device is provided. Knowledge of user interest inferred from a query and expected future location is used to render an advertisement in the navigation application. The advertisement is selected based on a location associated with a query received at the mobile device. In one design, advertisements are selected and rendered in a product-navigation application in a mobile device, which is used to determine the location of a product-choice. The advertisement for a promoted product is preferably rendered such that it represents the actual physical location of the promoted product in the store.

19 Claims, 14 Drawing Sheets

METHOD AND SYSTEM FOR DELIVERING ADVERTISEMENTS IN A STORE

BACKGROUND

The patent relates to a method of advertising a product to a customer based on expected behaviour of the user. More particularly, the patent discloses a method of advertising a product to the user of a mobile device based on knowledge of the user's current interest and expected location.

Wireless communication devices have become ubiquitous in the modern world. Wireless devices, particularly mobile phones and "smart phones" offer significant advantages to users due to their size, mobility and nature of use. These characteristics have led to an ever-increasing number uses that mobile devices are put to.

Delivery of product information or advertisements to consumers is most effective when the consumer is likely to be searching for a similar product. Several solutions have been developed to deliver targeted advertisements to mobile devices. US 20070198339 discloses a method of delivering advertisements to a mobile device based on location of the device and known device information. U.S. Pat. No. 7,860,519 discloses another method of delivering targeted advertisement to mobile devices based on the location of the device when user-specified location information is not available. However, existing advertising systems do not tailor advertisements for users based on knowledge of their current interests or expected behaviour.

SUMMARY OF THE INVENTION

In view of the foregoing, a method of determining availability and location of products in a store is provided. A user may enter the name of a product of interest at a mobile device, which information is used by an application installed on the device to compare with a data base of products maintained by the local store. The comparison provides information regarding the available quantities of the product as well as location information for the product. The mobile application determines the location of the user of the device and renders the user-location, location of the product and a map with a suggested path to reach the location.

According to one aspect of the invention, a complete product list and associated product-location information is sent to the device in a compressed format when the user enters a store. The information is stored locally in the device. The user may enter a query to search for availability and location information associated with a product of interest. An application installed on the device uses the saved product-location information and the current position of the user to compute a recommended path to the product, which is rendered on the store-map. Alternatively, at least one or more of the store-map, product list and the product-location information may be sent to the device any time after the customer enters the store. For instance, it would also be possible to send the information to the device in response to a query for a product.

According to a second aspect, information that is initially sent to the device during entry into the store is minimized to enhance the user experience. Only the updated product list for the store, the store-map and low-granularity location information is sent initially. The low-granularity location information may, in one embodiment, comprise the aisle number where a product can be found. A user, upon entering a product query close to the point of entry, will be able to identify the aisle where the product of interest is stored. As the user walk towards an aisle, high-granularity product-location information for that aisle is sent to the device. A richer and more detailed map is provided to help the user locate the product with greater precision. The mechanism permits location-based download of product-information to the device. The high-granularity information may be sent to the device in other ways. For instance, in one embodiment, the detailed map information is sent only for the aisle associated with a product query.

According to a third aspect, the user may download a store-map, the product list and associated location information for a particular store of interest through a personal computer before visiting the store. This method would be particularly useful to users of devices that do not feature radio modems for Wi-Fi or local area connectivity using IEEE 802.11a/b/g or similar standards. In one embodiment the product location information may be downloaded by visiting the website of the retail outlet, selecting the store of interest and downloading metadata to the mobile device. According to a fourth aspect, the product-list and associated location information for a particular store may be downloaded though a wireless wide area network such as GPRS, UMTS, LTE or CDMA 2000 mobile network.

According to a fourth aspect, a method and apparatus for receiving targeted advertisements is provided. A query is received at a navigation application operating on the mobile device, a geographical location corresponding to the query is identified and an advertisement for a promoted product is selected based on proximity of the promoted product to the identified location. The selected advertisement for the promoted product is rendered in the user interface of the navigation application.

In a fifth aspect, the advertisement selected according to the method of the preceding aspect may be rendered so that the advertisement represents the actual physical location of the promoted product in the navigation application.

DESCRIPTION OF THE PREFERRED EMBODIMENTS

The word "exemplary" as used hereafter is used to mean serving as an example or illustrative instance. Any design described herein as exemplary is not meant to be the preferred or sole embodiment.

Figure 1:
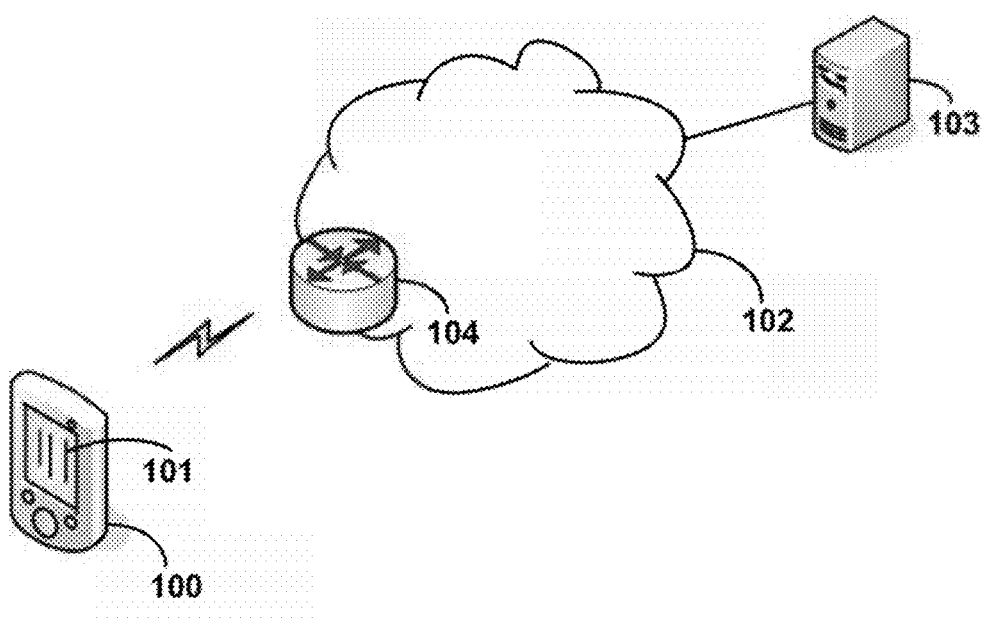
FIG. 1 shows an exemplary network deployment.

Referring now to FIG. 1, there is shown a mobile device 100 which may be cellular phone, smartphone, tablet PC, a notebook computer, an ultra-mobile PC or similar device, in accordance with one embodiment of this invention.

A product-location application 101, installed on the mobile device, would preferably operate over a wireless local area network 102 using unlicensed spectrum. Alternatively, it would operate over a mobile network conforming to the GSM, GPRS, UMTS, LTE, CDMA 2000 or IEEE 802.16 standards. The mobile device 100 communicates with a store server 103, which manages and delivers product and associated location information to mobile devices.

Figure 2:
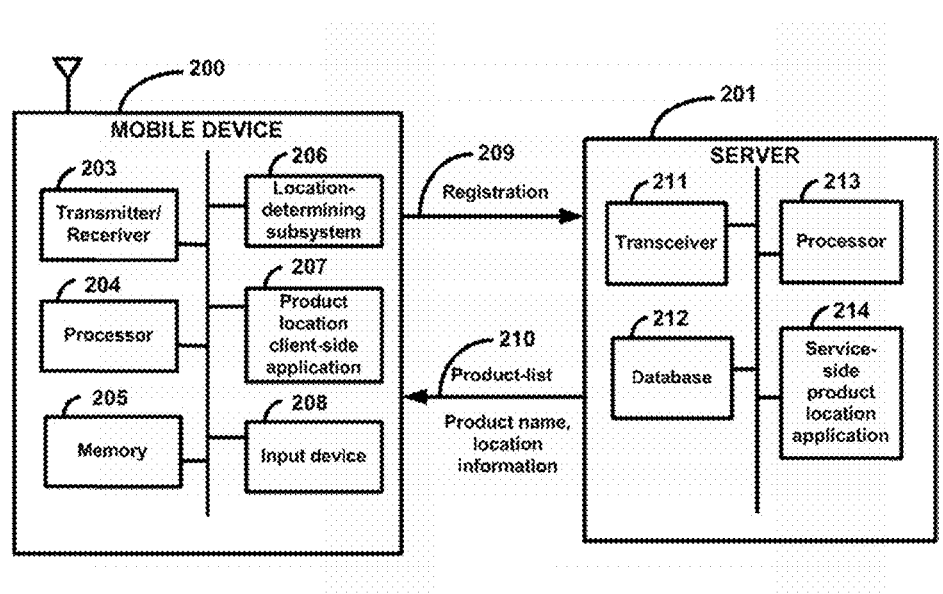
FIG. 2 shows block diagrams of a mobile device and a server, and messages exchanges there-between when a complete product-list including location information of products is sent to the device.

FIG. 2 is a block diagram of an exemplary design of the mobile device 200, the server 201 and the messages exchanged there-between. The mobile device 200 may be equipped with a transceiver 203 for communicating over the WLAN 102 such as, for example an IEEE 802.11a/b/g/n, Bluetooth, ZigBee or Ultrawideband network. Wireless local area networks are generally preferred by customers for data transmission due to the relatively higher cost of sending data over a cellular network. In addition to, local area connectivity, the mobile device 200 may also be capable of operation over a Wireless Wide Area Network (WWAN) such as GSM, GPRS, UMTS, HSPA, LTE or IEEE 802.16. Most current devices support multiple modes of operation and this trend is expected to continue in the future. In another embodiment, the transceiver 203 may only be capable of operating over a wide area network.

As shown in FIG. 2, the mobile device 200 may include at least one wireless transceiver 203, at least one processor 204 and memory 205. The wireless transceiver may be capable of transmitting and receiving information over a Wireless Local Area Network (WLAN) which may conform to any one of wireless standards such as IEEE 802.11a/b/g/n, Bluetooth or Ultra-wideband. The wireless transceiver may communicate with the mobile device via a wireless router or similar device. Alternatively the wireless transceiver may be capable of communicating over a cellular wireless standard such as GSM, GPRS, UMTS, LTE, CDMA 2000 or IEEE 802.16. In this implementation, the mobile device 200 would communicate with the server 201 through a base station. The processor 204 may carry out local processing tasks and facilitate communication with server.

The mobile device 200 may also include a Location-determining Subsystem 206 that determines the current location of the mobile device 200 in the store using one of the many available position-determining methods known in the industry. The device 200 may include a Global Positioning Subsystem (GPS) that receives ephemeris data from satellites to compute the present location of the device. Alternatively, the Location-determining Subsystem 206 may utilize ephemeris data received from satellites that are part of the European Galileo system or the Russian GLONASS system. The Location-determining Subsystem 206 may instead use any one of available indoor positioning systems cellular and WiFi triangulation methods to determine the position of the device 200 in the store. The device 200 may also include an input device 208 such as touch screen user interface, trackball, track pad, keys or thumb-wheel for user input. The input device may alternatively be a microphone for speech recognition.

Mobile device 200 may feature a pre-installed Product-location Client Application 207 that is designed to receive information from a store and render it the device 100 such that it is useful to the customer. The application 207 may either be installed at the factory or downloaded from a store or other website and installed by the user. The application 207 may be capable of receiving store-specific maps and rendering each of these maps on the display screen of the mobile device 200. The mobile application 207 would preferably be a generic application which may be used by the user to receive location information in any store, retail-outlet or warehouse that the customer visits. In another embodiment, the mobile application 207 may be customized and branded for a retail chain, so that it can be used only when the customer visits stores that are part of the retail chain.

The product-location system of FIG. 2 also includes a server 201. The server may include several modules such as a transceiver 211, a database 212, a processor 213 and a Server-side Product Location Application 214. The transceiver may be capable of communicating with the mobile device over a WLAN or a WWAN. The server includes a database 212 containing product information and associated data such as inventory and location of the product in the store. The database may be maintained by store personnel. The entry and updating of the location information may also be carried out automatically. The mechanism for doing so is beyond the scope of the present invention. In an exemplary embodiment, the database may be a pre-existing database that is maintained at a store location. The server application 207 may receive the high-granularity information and derive low-granularity information and store it for transmission with the product-list.

The Server-side Product Location Application 214 may be a server application that is integrated with the database 212 and performs functions that are not limited to retrieval of product information, formatting and delivery to mobile device, as needed. The delivery of product information may be in response to a query from the mobile device 200 or triggered by the position of the device 200 within the store. In an exemplary embodiment of FIG. 2, the server 201 sends a product-list 211 to mobile device 200 after the device completes registration 210 with the server. The product-list may include at least product information such as names of products, associate location information for products specifying their location, and a store-map illustrating layout of the store.

Figure 3:
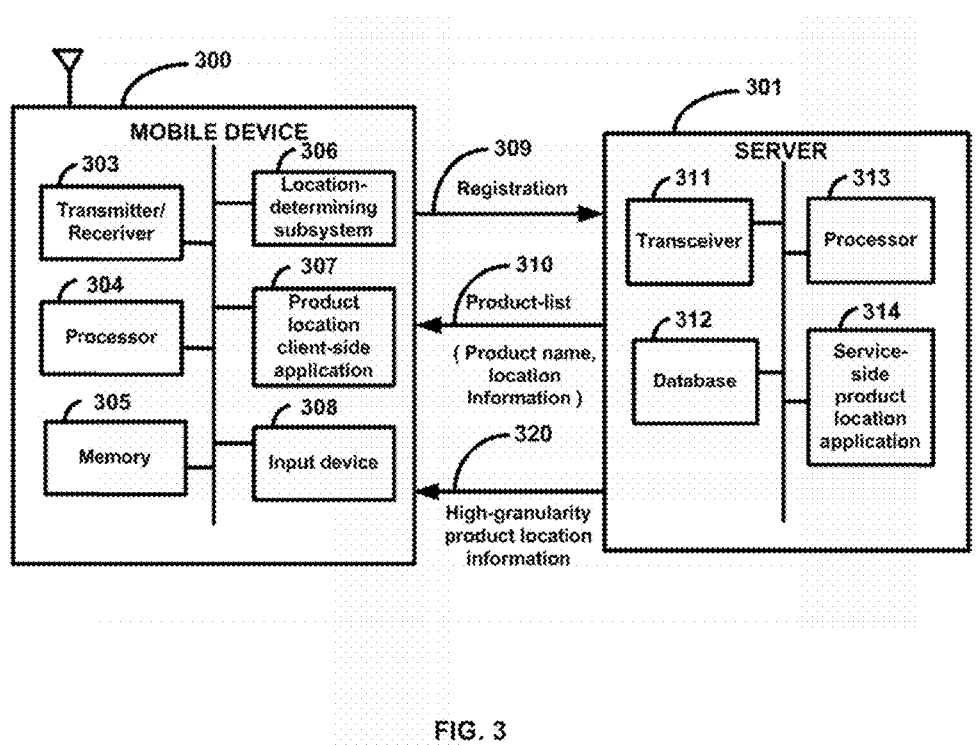
FIG. 3 shows block diagrams of a mobile device and a server, and messages exchanges there between when product-location information is sent to the device based on where the device is located.

FIG. 3 illustrates an alternative embodiment, where the server 302 sends product-location information to the device based on where the device is located in the store. The device 300 initially registers with server 300. Server 300 sends a product-list to the device in response to registration, where the product-list contains only the product information such as product names, low-granularity location information and the store-map. As discussed above, sending of low-granularity information helps reduce the perceived latency and thereby improves responsiveness of the application 307.

Figures 4, 5:
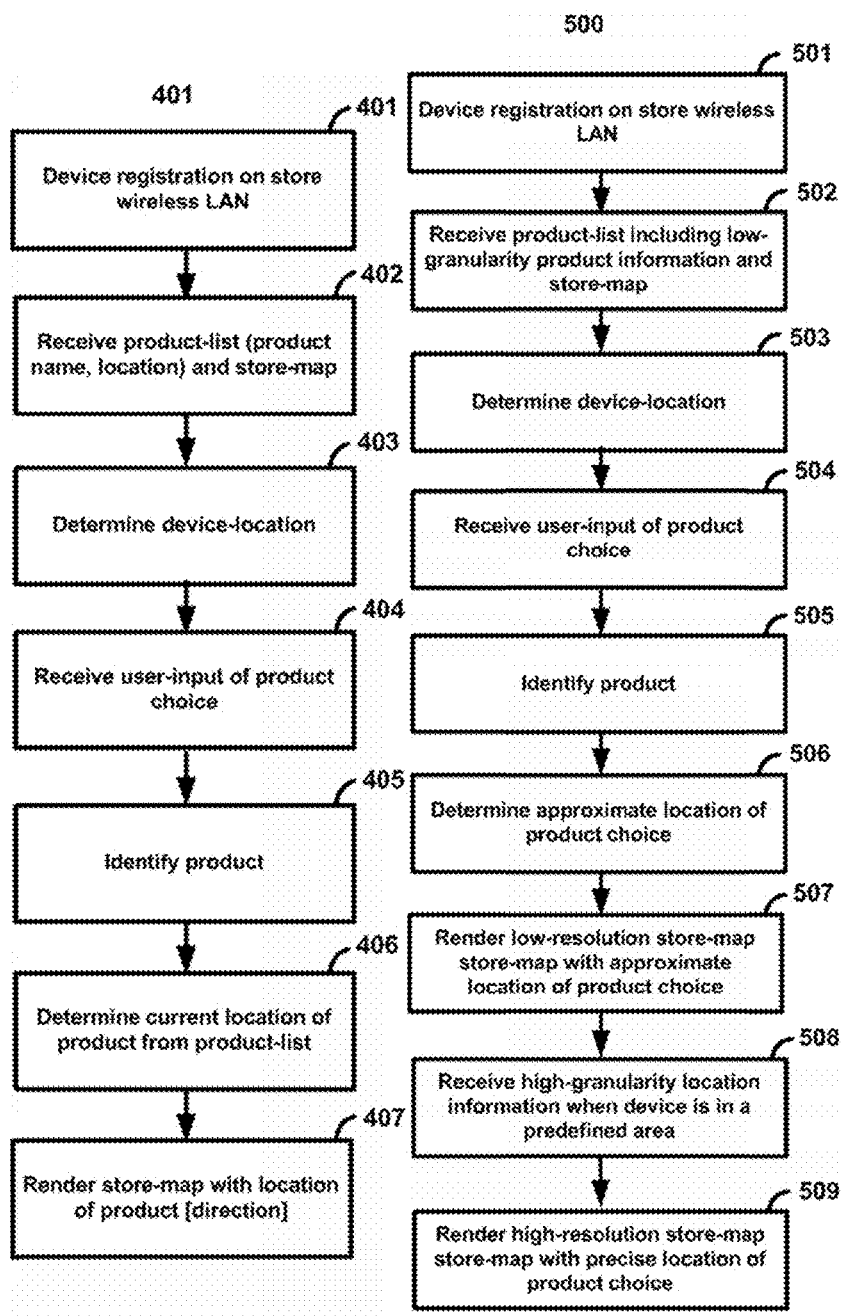
FIG. 4 is a flowchart that shows the steps taken in locating a product when complete product-location information is downloaded to the device.
FIG. 5 is a flowchart that shows the steps taken in locating a product when product-location information is sent to the device based on where the device is located.

FIG. 4 shows an exemplary flowchart for a process of delivering product-location information to the mobile device 200, when a complete product list is sent to the device as the user enters the store. The method enables customers to efficiently locate a product in a store. A customer may use an entity such as mobile device 200 to accomplish the said task. The mobile device 200 may register on a store-specific wireless local area network 102 when the customer first enters the store (block 401). The wireless local area network 102 may be operated by the store or an affiliate. Registration on the WLAN 102 may be either manual or automatic. For instance, the mobile device 200 may optionally detect the present of a pre-defined wireless local area network 102 when the customer first enters a store. The identity of the predefined network 102 could be stored in the device 200 when the customized mobile application 207 is downloaded from a store website. In another aspect, the customer may search for the network 102, select and register on the network through the user-interface of the device. The device 200 would preferably be identified and authenticated on the network without much delay. This may be accomplished for instance by saving an authentication password for a retail outlet. Several alternative methods to accomplish this task are known in the art. Subsequent to registering on the WLAN or WWAN, the mobile device may register itself with the server 201. Various method of performing device validation are known in the art. The device 200 could in an exemplary embodiment send a device ID and an application ID so that the server may validate use of the Product Location Application 207 at the device.

Once the mobile device 200 registers on the network 102 and/or server 201, the server may send a product list to the device (block 402). The product list includes at least product information such as product names, high-granularity product-location information, indicating precisely where in the store the product may be located, and a store-map for the store as illustrated in one embodiment in Table 1.

TABLE 1

Sample Product list with high-granularity location information

| No. | Product name | Product-location |
|---|---|---|
| 1. | Lindt Dark Chocolate (100 g) | Aisle E; Row 4; Shelf 5 |
| 2. | Kilimanjaro Tea (500 g) | Aisle A; Row 2; Shelf 1 |
| 3. | Ginger paste (120 g) | Aisle B; Row 5; Shelf 1 |

Figure 6:
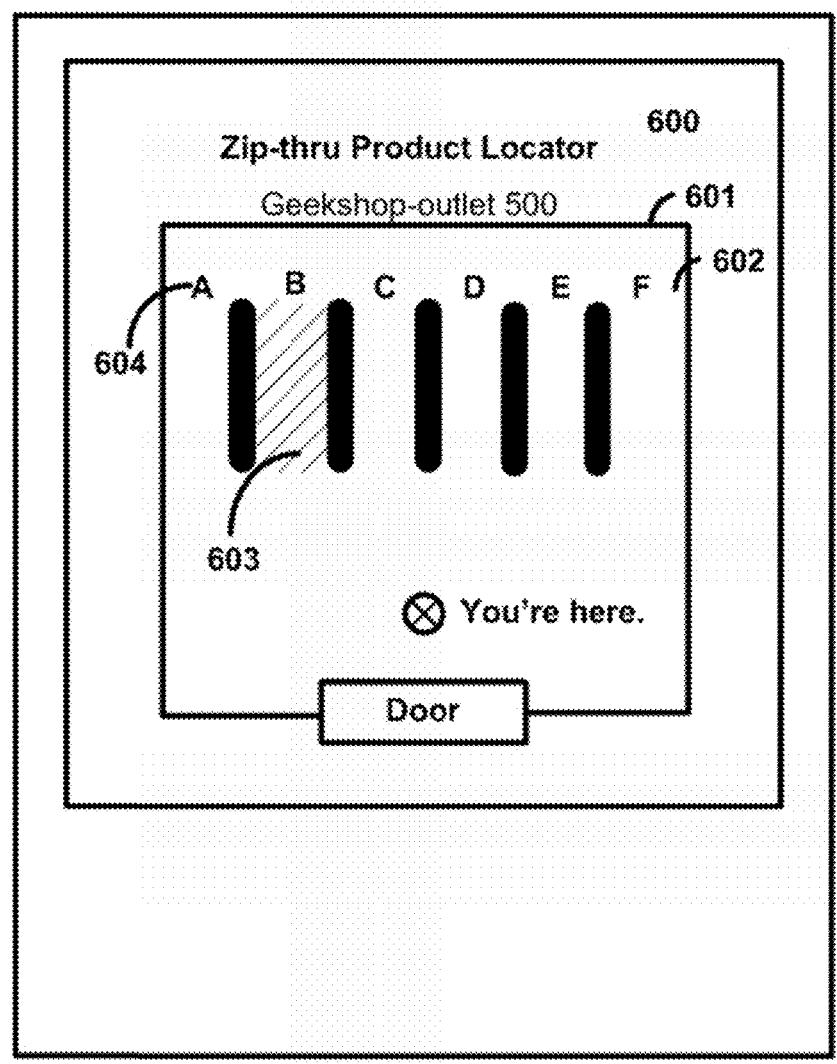
FIG. 6 is an illustration of a store-map that is displayed on the user interface of the mobile device, with the store-map displaying low-granularity location information for a product of interest.

FIG. 6 is an illustrative embodiment of a store-map 602 that is displayed on the user interface 601 of the mobile device 600. The store-map 602 may contain at a minimum, a representation of the aisles 603, the aisle numbers 604, and preferably the shelves and shelf numbers. As is apparent, the store-map may be site-specific.

In addition to the store-map, the server entity in the store may send via the network, a product-list. The product-list may contain a list of all products sold at the store. Alternatively, the list may contain only the products that are currently available in the store. The product list for a retail chain would preferably be standardized so that a product is referred to by only by a single name. The server may also send to the device inventory information about the product. The inventory information may vary from a basic indication as to whether the product is available or not, to details regarding the exact quantities of the products that are currently available in the store. This information would help the customer decide whether to walk further into the store to find the product or leave if the product is not currently available.

The server 201 also sends location information for the products while the device is proximate to the point of entry into the store. The location information may, in a first embodiment, comprise high-granularity location information that specifies precisely where in the store a product of choice may be located. The high-granularity location information may be sent to mobile device 200 soon after the device registers with the server 201. An example of high-granularity location information is illustrated in Table 1.

The location-determining subsystem 206 of the mobile device 200 may determine location of the device (block 403) inside the store using any one of methods mentioned above, which is generally known in the art. The current location of the user is available to the client on a near real-time basis. The device may receive user input (block 404) specifying the product-choice, which is the product that the customer is trying to locate. The client application 207 may the identify the product by comparing the entered product-choice with product names in the received product list (block 405). When a match is found, the application (207) retrieves location information for the product from the product-location column of the product list (block 406). The product location, in the first embodiment, comprises high granularity location information such as the aisle number, row number and shelf number in the store. The client application (207) may use the retrieved product-location information to display the store-map and render the location of the product in the store with respect to present location of the device (block 407). The application (207) may further indicate the shortest path to get the product of interest one the map.

Even though process 400 is described to be occurring as the user enters the store, it would be understood that the sending of the product list in this embodiment may occur when the device is proximate to the entrance, irrespective of whether the user is inside the store or outside.

FIG. 3 illustrates messages exchanged between the mobile device 300 and the server 301 in the second exemplary embodiment. The process is further described below. In the second exemplary embodiment (FIG. 5), the product-list that is sent to mobile device 300 soon after registration may contain low-granularity information which describes an approximate area of the store where each of the products are located (block 502). For instance, the store may be divided into numbered aisles with location of the product being defined by the aisle number alone. Sending the product list containing just the aisle numbers, as illustrated in Table 2, would understandably reduce the amount of data that would need to be sent to the client on the device as the customer enters the store. The reduced latency would thereby result in a better customer experience. The information described above would be necessary for the customer to use the client application 307 in a satisfactory manner. In one scenario (FIG. 6), the customer may decide to search for the product "Ginger paste" and its location soon after entering the store or close to the point of entry. In that event, the received product-list containing the aisle numbers for the products would facilitate identifying an approximate area where the product-choice may be found (block 506). The client application 207 may highlight the aisle where the product-choice is located so that the user may move in the right direction (block 507).

TABLE 2

Sample Product list with low-granularity location information

| No. | Product name | Product-location |
|---|---|---|
| 1. | Lindt Dark Chocolate (100 g) | Aisle E |
| 2. | Kilimanjaro Tea (500 g) | Aisle A |
| 3. | Ginger paste (120 g) | Aisle B |

Further location information may be sent to the device as the customer and the mobile device 300 reach predefined areas in the store (block 508). The client application 307 may compare the user's present location with the aisle where the product of interest is located and trigger a location-based request for further information to the server 301. The server 301 may respond by sending to the device 300 high-granularity information for the predefined area such as Aisle B. The high-granularity data would consist of information that would enable the user to precisely locate the product in the store. For instance, the high-granularity information may specify the shelf number where the product is located. The client application 307 receives the high-granularity information and renders a richer map for Aisle B (block 509). The customer thereby effortlessly reaches the product of choice without having to search for a store-attendant instead.

Figure 7:
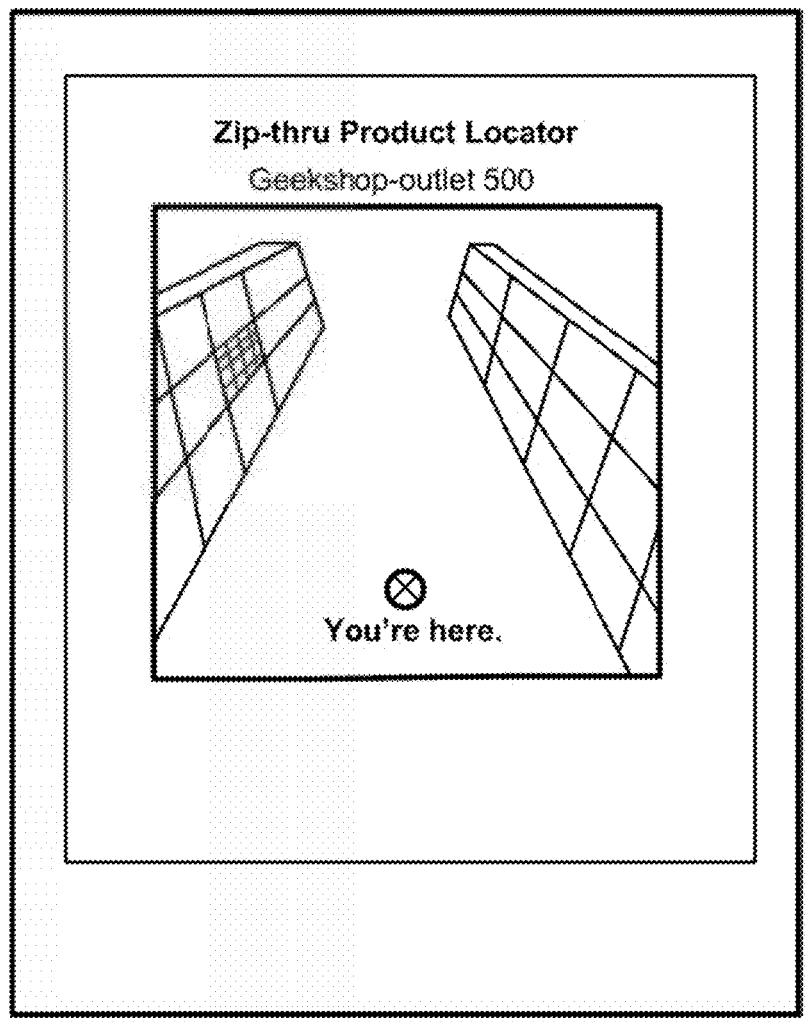
FIG. 7 is an illustration of a store-map that is displayed on the user interface of the mobile device, with the store-map displaying high-granularity location information for a product of interest.
Figure 8:
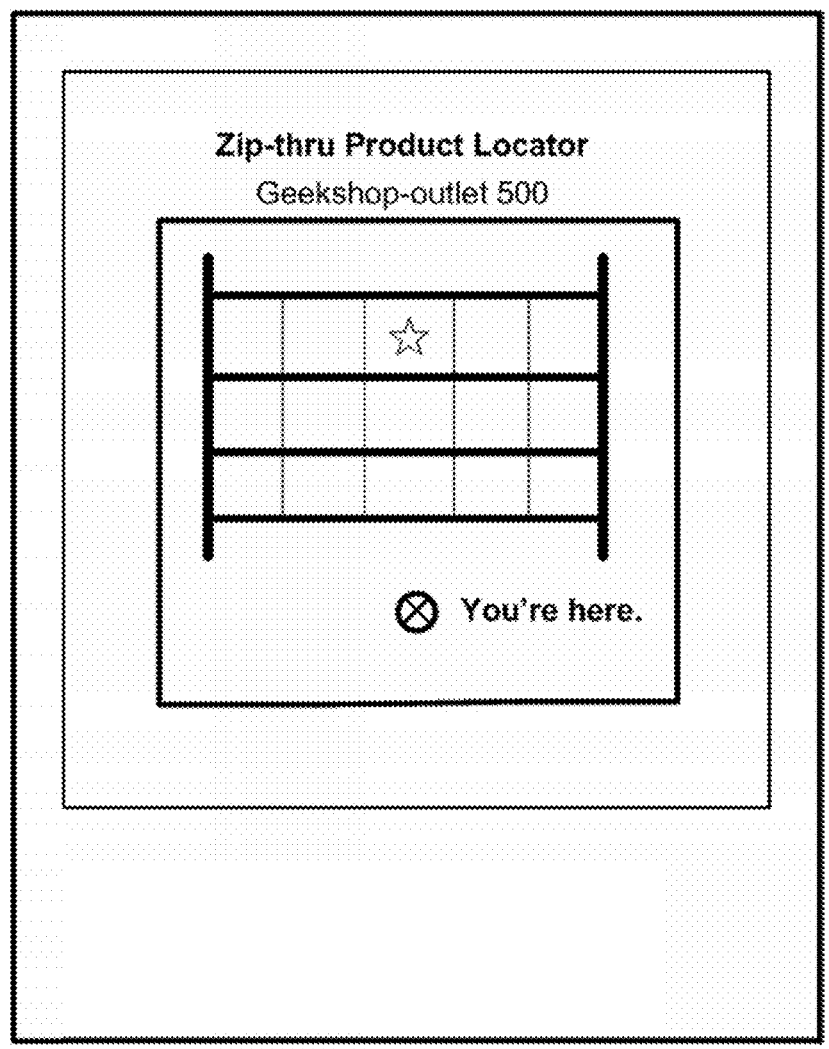
FIG. 8 is an illustration of a store-map that shows the precise location of the product of interest after the device receives high-granularity location information and is positioned in close proximity to the product of interest.

The predefined area may be better understood with reference to FIG. 6. The pre-defined area may, in one aspect, be an aisle number. For instance, as the customer walks past the entrance, he may search for the product, "Ginger paste". The client application 307 may indicate that the product "Ginger paste" can be found in Aisle B 603. The customer may then walk towards Aisle B and receive further high-granularity location information for Aisle B as he approaches the aisle. FIG. 7 illustrates an exemplary user interface view after the user reaches Aisle B and receives high-granularity location information for that aisle. The device may track the position of the user with respect to the product-choice and alter the view accordingly. FIG. 8 illustrates and exemplary view where the client application 307 displays the precise location of the product in the shelf after detecting the position and orientation of the mobile device 300 with respect to that of the product of interest.

Figure 9:
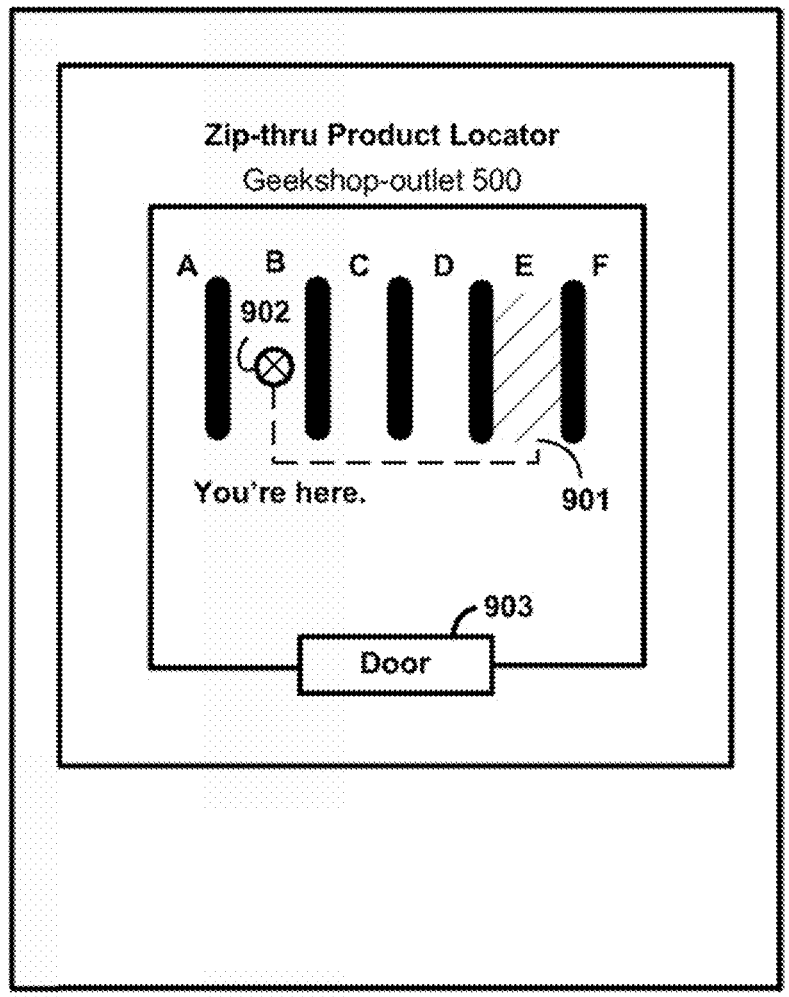
FIG. 9 an illustration of a store-map that is displayed on the user interface of the mobile device when a second product is searched for by the user, who is located anywhere inside the store.

The current location of the user may be available to the client on a near real-time basis. The client application 307 may thus be able to locate a product when the customer is located anywhere in the middle of the store. For instance, after finding the product "Ginger paste" the user may decide to look for the "Lindt Dark Chocolate". The client application 307 detects the present location of the device 300 and identifies the product-choice. When a match is found, the client application 307 determines that the product of interest is located in Aisle E. Since, device 300 has not visited Aisle E before, it can only render an approximate location of the product "Lindt Dark Chocolate". Aisle E may be highlighted on the store-map (FIG. 9). The user may walk towards the aisle and receive high-granularity information for the products in aisle, using a client application-triggered location-based query.

In a further aspect, the high-granularity information for all the aisles and areas are sent to the device soon after the product-list is sent based on a mechanism other than a location-based trigger. This last mechanism may however lead to higher perceived latency when the data rate of the WLAN is low or/and when the store-size is very large.

Alternative methods of downloading the product-list to the mobile device 200/300 may be carried out. For instance, the product-list could, in an alternative embodiment, be downloaded to the mobile device from a store-website, prior to visiting a particular store.

Product Advertisements Based on Proximity to the Product-Choice

Figure 10:
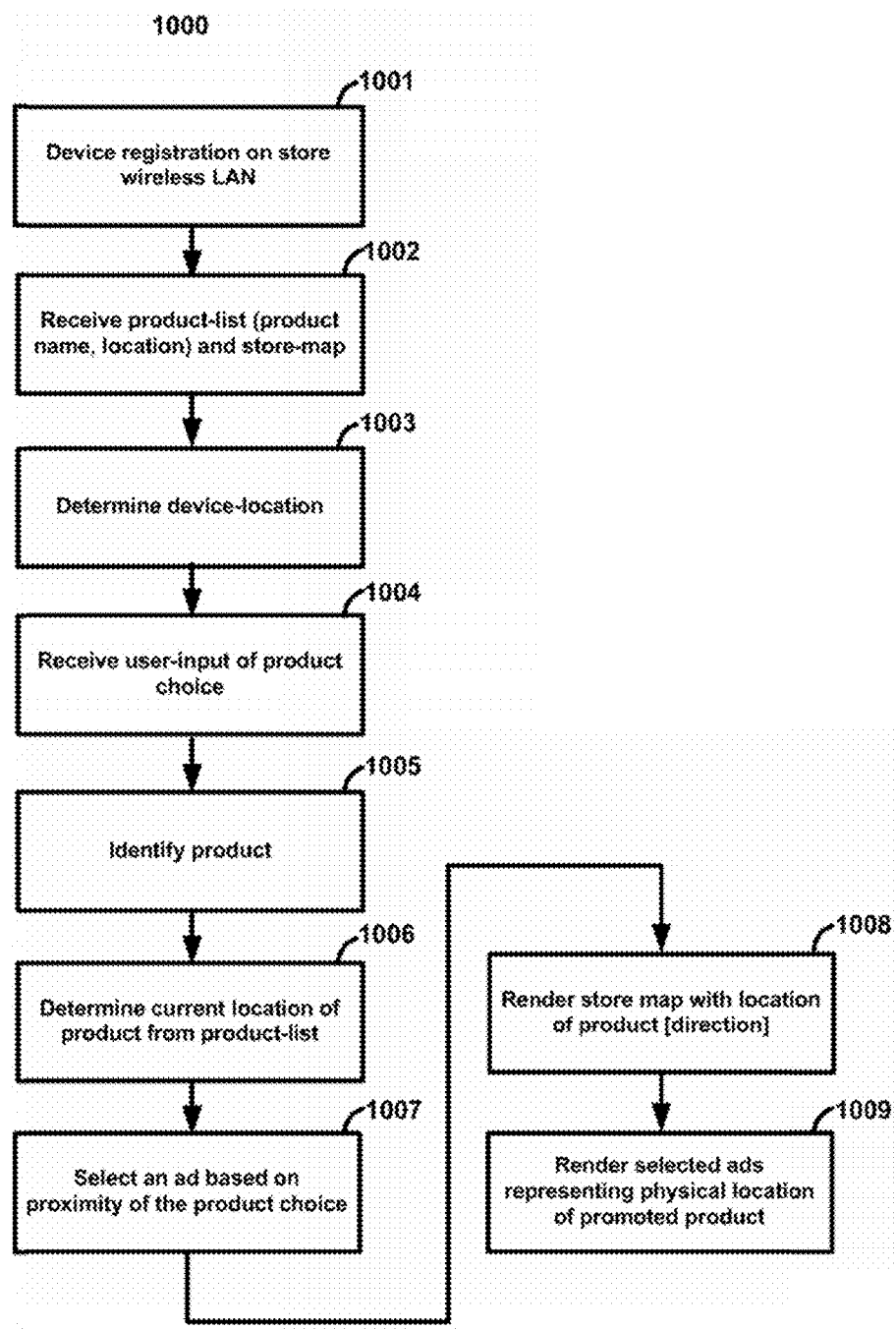
FIG. 10 is a flowchart that shows the steps taken in locating a product using a product-location application and delivering advertisements along with the location information for a product.
Figure 11:
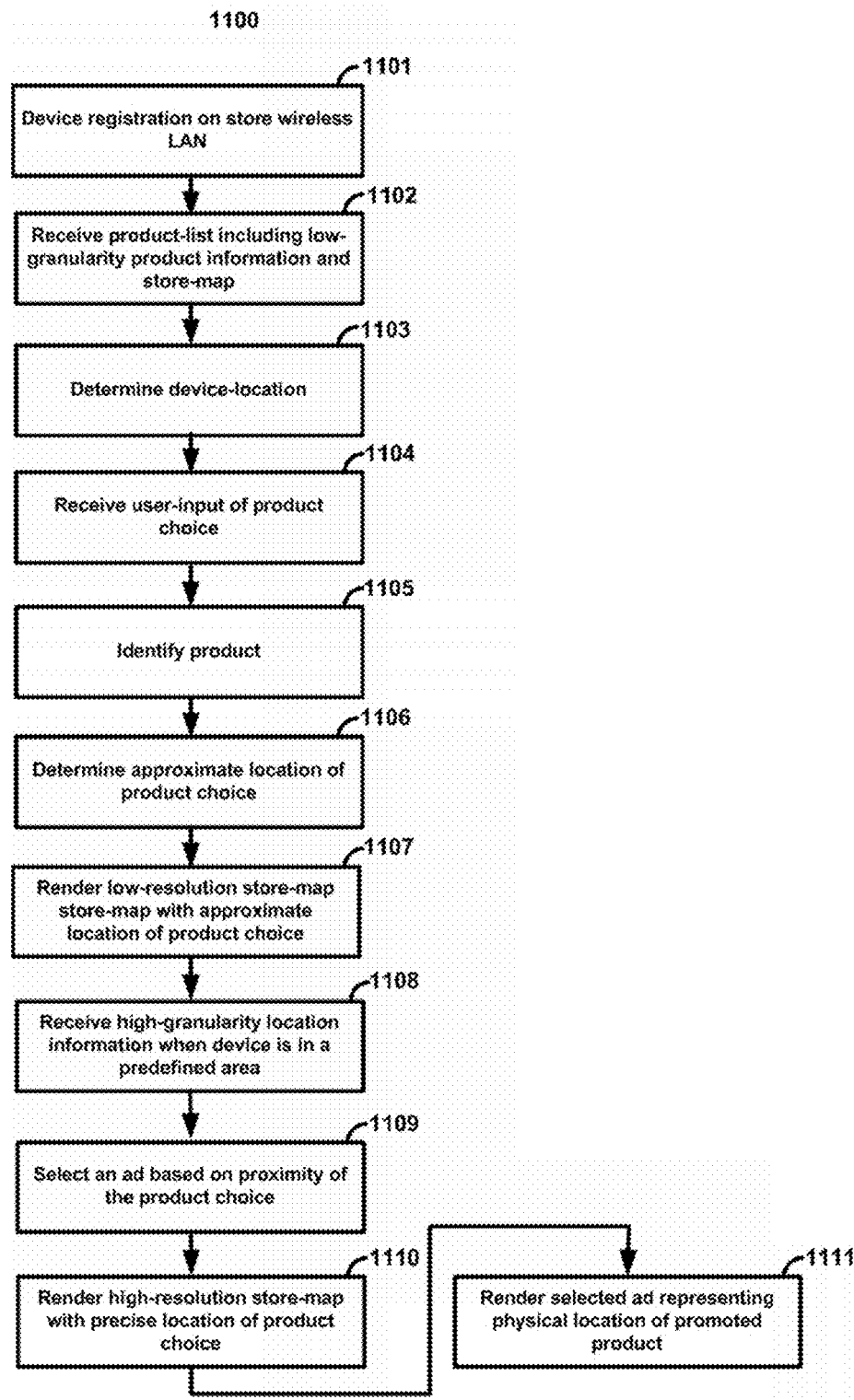
FIG. 11 is a flowchart that shows the steps taken in locating a product and rendering an advertisement relevant to location of the product-choice when product-location information is sent to the device based on where the device is located.
Figure 12:
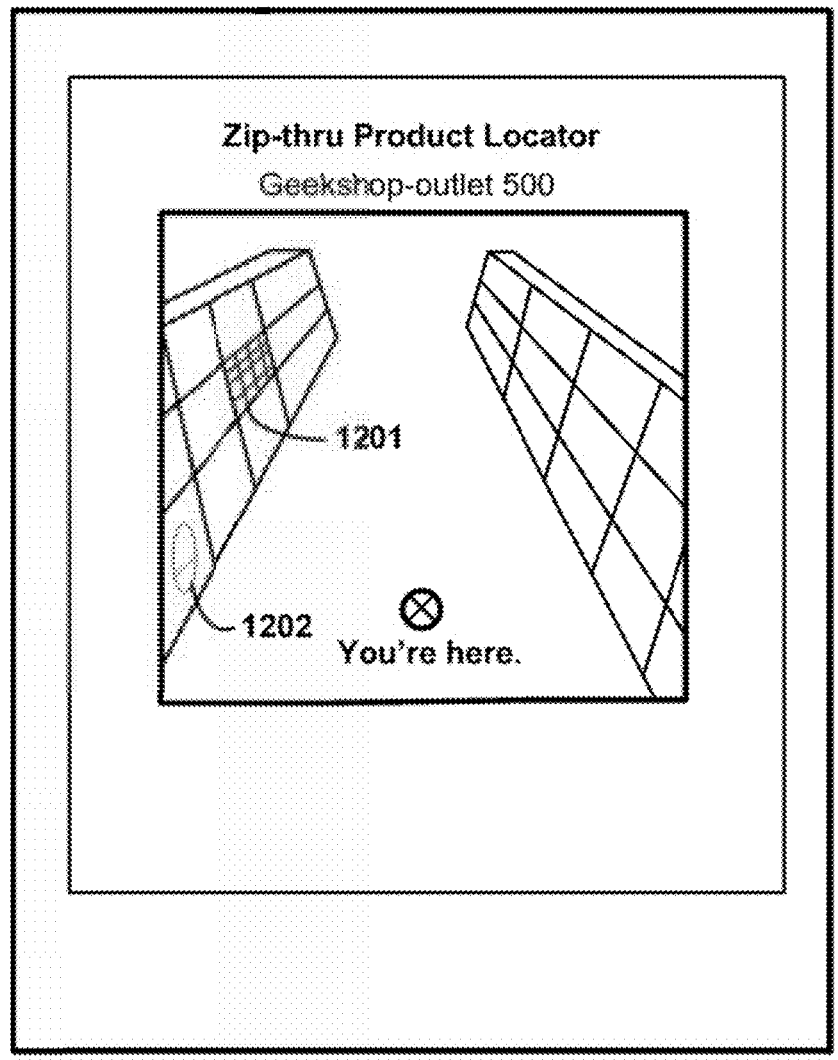
FIG. 12 is an illustration of a store-map that is displayed on the user interface of the mobile device, with the store-map displaying high-granularity location information for a product of interest along with an advertisement for a promoted product, where the advertisement represents the actual physical location of the promoted product.

FIG. 10 is an illustrative embodiment of the invention in which advertisements for a promoted product may be delivered to the mobile device along with location information for the product-choice. Knowledge of expected user behaviour may be utilized to deliver the targeted advertisement. In the illustrative embodiment of FIG. 10, the customer may use an entity such as mobile device 200 to search for a product-choice while in a store. The mobile device 200 may register on a store-specific wireless local area network 102 when the customer first enters the store (block 1001). The wireless local area network 102 may be operated by the store or an affiliate. Registration on the WLAN 102 may be either manual or automatic as described above.

Once the mobile device 200 registers on the network 102 and/or server 201, the server may send a product list to the device (block 1002). The product list includes at least product information such as product names, high-granularity product-location information, indicating precisely where in the store the product may be located, and a store-map for the store as illustrated in one embodiment in Table 1.

The location of mobile device 200 and the location information derived from the received product list may be used to obtain the current location of the product-choice using any one of the methods detailed above. In addition, the entered product-choice may be utilized to select a relevant advertisement (block 1007). The location 1201 associated with the product-choice 200 that is available to the product location application may be used for determining the most pertinent advertisement 1202 that is to be rendered at a given time (block 1009). By selecting an advertisement based on the location of the product-choice being searched for by the user, the customer's interest at a given time and expected or known future location may be used to deliver an advertisement depending on where the customer is expected to gaze while arriving to pick up the product-choice 200. Here, the method leverages the almost certain knowledge that the customer's gaze is likely to fall on the product-choice 200 and its proximity.

Figure 13:
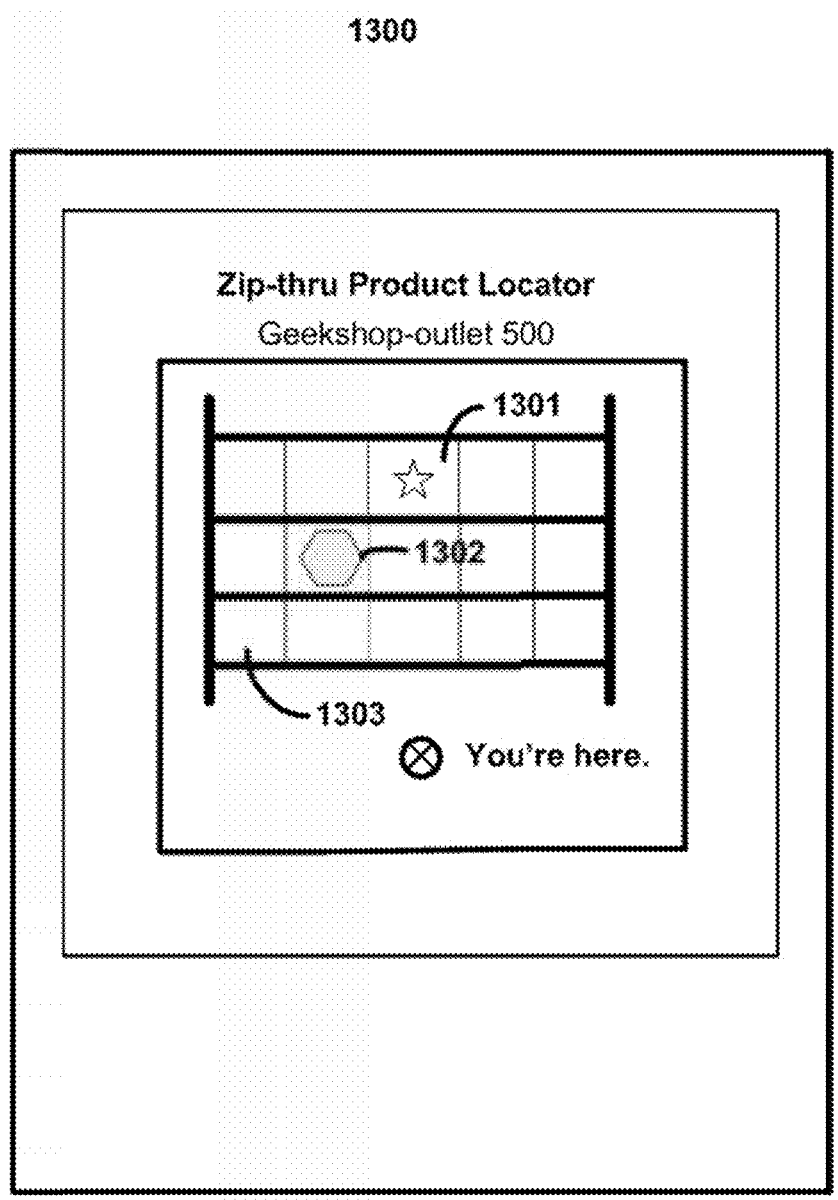
FIG. 13 is an illustration of a store-map that shows the precise location of the product of interest along with an advertisement for a promoted product after the device receives high-granularity location information and is positioned in close proximity to the product-choice, with advertisement representing actual physical location of the promoted product on the store shelf.

FIG. 13 illustrates an embodiment of the invention in which the advertisement for the promoted product 1302 on the store map 1303 preferably represents the actual physical location of the promoted product in the store. This would allow retailer to sell targeted advertising space within a store-customized application.

The advertisement may be selected either at the server or at the client application. In the embodiments outlined above advertisements may be selected at the server and delivered to the mobile device 200 along with the product-list 211 or with high-granularity location information which is sent to the device based on its location in the store. Alternatively, the advertisement may be selected by the client application 207 using location of the mobile device and known location of the product-choice. In this implementation, an advertisement database may be located at the mobile device 200.

Figure 14:
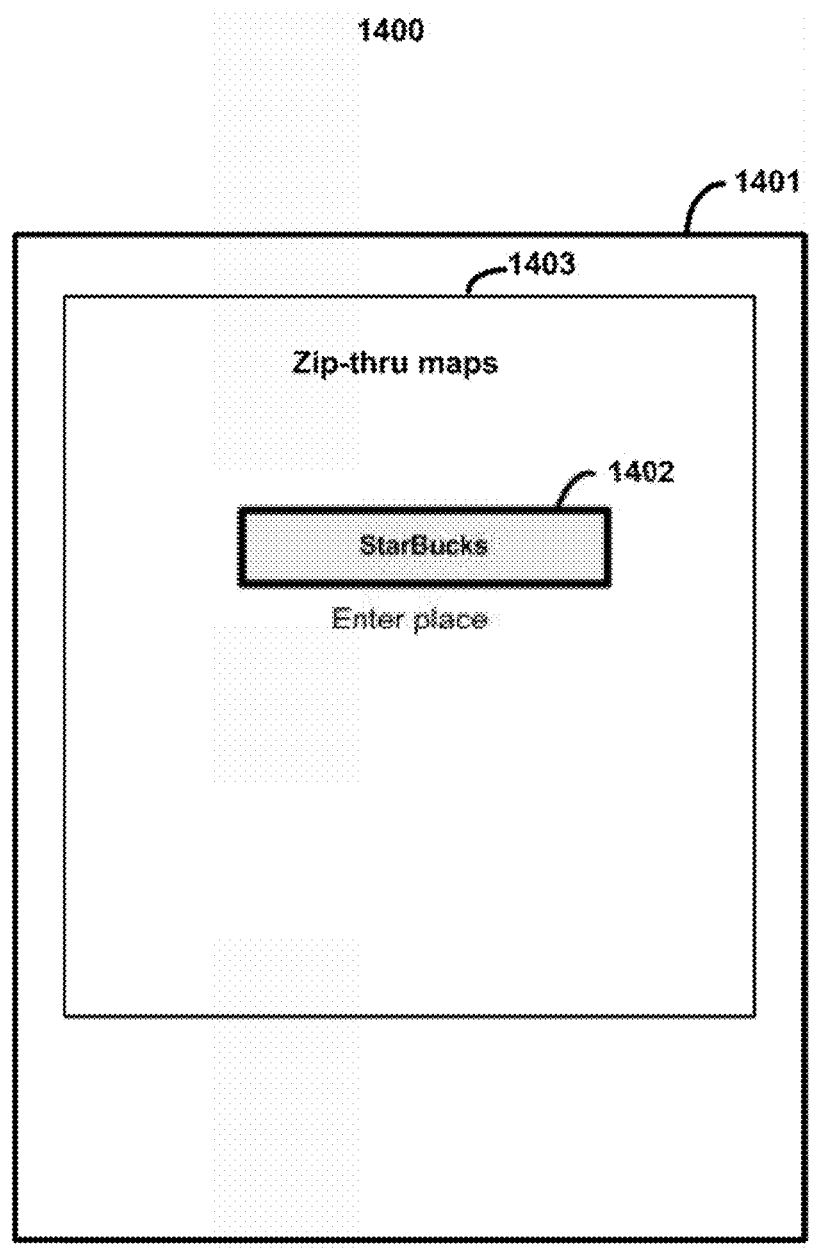
FIG. 14 illustrates the user interface of a navigation application on the mobile device, the user interface including a field for entry of a query by the user.
Figure 15:
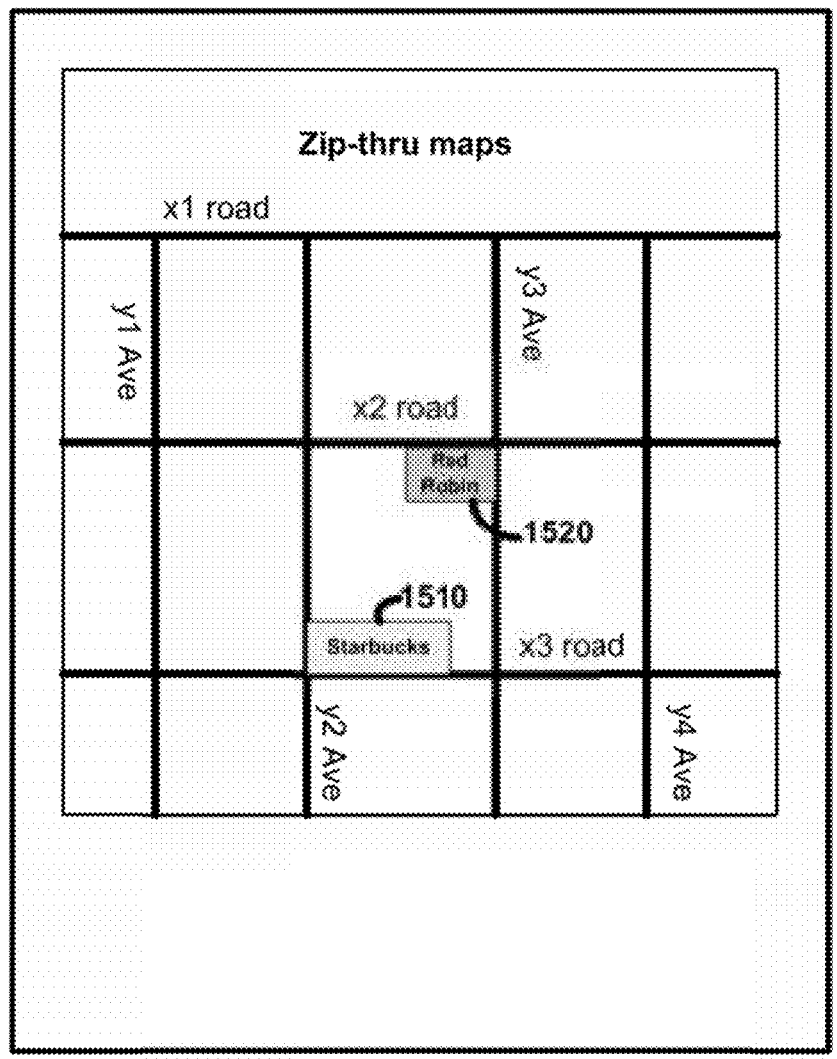
FIG. 15 illustrates a street map showing a target location and an advertisement in the navigation application, where the displayed advertisement is selected based on a location associated with the entered query.

The exemplary targeted advertising method outlined above deals with the delivery of advertisements for a promoted products when the user of the mobile device is inside the store. However, it would be appreciated that variants and modifications are possible without deviating from the scope of the invention described. For instance, FIG. 14 illustrates an exemplary embodiment where the user may be outdoors searching for a location, product or service in a navigation application installed on the mobile device 1401. The method of the invention may be used to determine a location associated with the query 1402. The query of the present example, "Starbucks", is received by the navigation application which may identify the closest Starbucks store using the known location of mobile device 200. In addition, the navigation application may also identify a relevant advertisement 1520 for a product that is within a predefined distance of the closest Starbucks store 1510. The knowledge of expected user behaviour, i.e. the likelihood of buying a drink can be utilized to promote a nearby alternative product or service to the product-choice. The advertisement delivery mechanism would allow retailers to capture the attention of potential customers just when they are nearby and looking for a similar product or service.

Even though the foregoing embodiment describes the invention with reference to a network server, it would be appreciated that a mobile computing device such as a tablet or smartphone could also support the functionality of the server when the server-side application 101 is installed. The exemplary embodiments above have been primarily described in the context of wireless local area networks. However, persons skilled in the art would appreciate that variants such as a cellular network may be used without deviating from the scope of the invention as described.

The invention claimed is:

1. A product discovery system comprising:
a server processor configurable to be in communication with a mobile device;
a memory in communication with the server processor, the memory storing product location information comprising low-granularity product location information and high-granularity product location information; and
a transceiver connected to the server processor for transmitting data to and receiving data from the mobile device;
wherein the server processor is configured to:
obtain a first location of the mobile device and compare the first location of the mobile device to a first predetermined area;
in response to determining that the first location of the mobile device is located within the first predetermined area, provide to the mobile device a first portion of the product location information, the first portion comprising the low-granularity product location information, wherein the low-granularity product location information comprises an aisle number in which each product is located;
determine a second location of the mobile device and compare the second location of the mobile device to a second predetermined area; and
in response to determining that the second location of the mobile device is located within the second predetermined area, provide to the mobile device a second portion of the product location information, the second portion comprising the high-granularity product location information;
receive from the mobile device a product indication; and
in response to receiving the product indication, identify, from the product location information, an in-store location of a product associated with the product indication, and select and provide to the mobile device an advertisement for a promoted product, the advertisement selected based on the in-store location of the product associated with the product indication, wherein the in-store location of the product associated with the product indication is indicative of an expected proximity of a user of the mobile device to the promoted product, and wherein the promoted product is selected by an advertiser.

2. A product discovery system according to claim 1 wherein the advertisement comprises product location information associated with the promoted product.

3. A product discovery system according to claim 2 wherein the server processor is configured to provide to the mobile device product mapping information, the product mapping information comprising the advertisement, a location of the mobile device and the first portion of the product location information.

4. A product discovery system according to claim 1 wherein the high-granularity product location information comprises location information corresponding to the in-store location of the product associated with the product indication.

5. A product discovery system according to claim 4 wherein the second predetermined area is more proximate to the in-store location of the product associated with the product indication than is the first predetermined area.

6. A product discovery system according to claim 1 wherein the first predetermined area comprises an entrance to a building.

7. A product discovery system according to claim 1 wherein the advertisement is selected based on the first location of the mobile device.

8. A computer program product comprising a non-transitory computer readable medium having instructions recorded thereon, for execution by a processor on a mobile device in communication with a server processor, wherein the instructions comprise the steps of:
downloading from the server processor low-granularity product location information, wherein the low-granularity product location information comprises an aisle number in which each product is located;
transmitting, to the server processor, information identifying a first location of the mobile device, wherein the low-granularity product location information corresponds to a first predetermined area in which the first location of the mobile device is located;

transmitting, to the server processor, information identifying a second location of the mobile device;
downloading high-granularity product location information corresponding to a second predetermined area in which the second location of the mobile device is located;
receiving from a user a product indication, and transmitting the product indication to the server processor;
identifying, from the product location information, an in-store location of a product associated with the product indication, and
downloading from the server processor an advertisement for a promoted product, the advertisement selected based on the in-store location of the product associated with the product indication, wherein the in-store location of the product associated with the product indication is indicative of an expected proximity of a user of the mobile device to the promoted product and wherein the promoted product is selected by an advertiser; and
displaying the advertisement on the mobile device.

9. A computer program product according to claim 8 wherein the advertisement comprises product location information associated with the promoted product.

10. A computer program product according to claim 8 wherein the instructions comprise the steps of:
displaying in a product map on the mobile device the in-store location of the promoted product, a location of the mobile device and the in-store location of the product associated with the product indication.

11. A computer program product according to claim 8 wherein the high-granularity product location information comprises location information corresponding to the in-store location of the product associated with the product indication.

12. A computer program product according to claim 11 wherein the second predetermined area is more proximate to the in-store location of the product associated with the product indication than is the first predetermined area.

13. A computer program product according to claim 8 wherein the first predetermined area comprises an entrance to a building.

14. A method performed by a server processor in communication with a mobile device, the method comprising the following steps:
obtaining by the server processor a first location of the mobile device and comparing the first location of the mobile device to a first predetermined area;
in response to determining that the first location of the mobile device is located within the first predetermined area, obtaining by the server processor low-granularity product location information, wherein the low-granularity product location information comprises an aisle number in which each product is located;
the server processor transmitting the low-granularity product location information to the mobile device;
obtaining by the server processor a second location of the mobile device and comparing the second location of the mobile device to a second predetermined area; and
in response to determining that the second location of the mobile device is located within the second predetermined area, the server processor transmitting to the mobile device high-granularity product location information;
receiving from the mobile device a product indication; and
in response to receiving the product indication, the server processor identifying, from the product location information, an in-store location of a product associated with the product indication and selecting and transmitting to the mobile device an advertisement for a promoted product, the advertisement selected based on the in-store location of the product associated with the product indication, wherein the in-store location of the product associated with the product indication is indicative of an expected proximity of a user of the mobile device to the promoted product and wherein the promoted product is selected by an advertiser.

15. A method according to claim 14 wherein the advertisement comprises product location information associated with the promoted product.

16. A method according to claim 15 comprising the server processor transmitting, to the mobile device, product mapping information, the product mapping information comprising the advertisement, a location of the mobile device and the low-granularity product location information.

17. A method according to claim 14 wherein the high-granularity product location information comprises location information corresponding to the in-store location of the product associated with the product indication.

18. A method according to claim 17 wherein the second predetermined area is more proximate to the in-store location of the product associated with the product indication than is the first predetermined area.

19. A method according to claim 14 wherein the first predetermined area comprises an entrance to a building.

* * * * *